US012566687B2

(12) United States Patent
Zhang

(10) Patent No.: US 12,566,687 B2
(45) Date of Patent: Mar. 3, 2026

(54) ENERGY EFFICIENCY EVALUATION METHOD AND RELATED DEVICE

(71) Applicant: HUAWEI TECHNOLOGIES CO., LTD., Shenzhen (CN)

(72) Inventor: Kai Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 663 days.

(21) Appl. No.: 17/966,202

(22) Filed: Oct. 14, 2022

(65) Prior Publication Data

US 2023/0032235 A1     Feb. 2, 2023

Related U.S. Application Data

(63) Continuation of application No. PCT/CN2021/086813, filed on Apr. 13, 2021.

(30) Foreign Application Priority Data

Apr. 16, 2020     (CN) .......................... 202010299418.2

(51) Int. Cl.
    *G06F 11/30*          (2006.01)
    *H04W 4/38*           (2018.01)
                          (Continued)

(52) U.S. Cl.
    CPC ........... *G06F 11/3062* (2013.01); *H04W 4/38* (2018.02); *H04W 24/08* (2013.01); *H04W 52/0254* (2013.01); *H04W 52/0258* (2013.01)

(58) Field of Classification Search
    USPC ......................................................... 702/60
    See application file for complete search history.

(56) References Cited

U.S. PATENT DOCUMENTS

| 2009/0231152 A1* | 9/2009 | Tung ........................ G06F 1/206 |
| | | 340/660 |
| 2010/0332373 A1* | 12/2010 | Crabtree ................ G06Q 40/04 |
| | | 709/224 |

(Continued)

FOREIGN PATENT DOCUMENTS

| CN | 103782620 A | 5/2014 |
| CN | 104391701 A | 3/2015 |

(Continued)

OTHER PUBLICATIONS

3GPP TR 32.972 V16.1.0, "3rd Generation Partnership Project; Technical Specification Group Services and System Aspects; Telecommunication Management; Study on System and Functional Aspects of Energy Efficiency in 5G Networks (Release 16)," Sep. 2019, 30 pages.

(Continued)

*Primary Examiner* — Paul D Lee
(74) *Attorney, Agent, or Firm* — Fish & Richardson P.C.

(57)     ABSTRACT

One example energy efficiency evaluation method comprises obtaining, by a service producer, service energy consumption data of the target object, where the service energy consumption data includes service information and energy consumption information of the target object. The service producer can then determine energy efficiency information of the target object based on the service energy consumption data.

19 Claims, 5 Drawing Sheets

(51) Int. Cl.
    *H04W 24/08*         (2009.01)
    *H04W 52/02*         (2009.01)

(56)           References Cited

U.S. PATENT DOCUMENTS

| | | | | |
|---|---|---|---|---|
| 2013/0231979 A1* | 9/2013 | Nelson | | G06Q 10/06 |
| | | | | 705/7.38 |
| 2014/0214344 A1* | 7/2014 | Ou | | G01R 21/00 |
| | | | | 702/60 |
| 2018/0052574 A1* | 2/2018 | Wolfe | | G06F 1/26 |

FOREIGN PATENT DOCUMENTS

| | | |
|---|---|---|
| CN | 105493545 A | 4/2016 |
| CN | 106487799 A | 3/2017 |
| CN | 108234228 A | 6/2018 |
| CN | 110831134 A | 2/2020 |
| WO | 2014022960 A1 | 2/2014 |

OTHER PUBLICATIONS

3GPP TS 28.310 V16.0.0, "3rd Generation Partnership Project; Technical Specification Group Services and System Aspects; Management and Orchestration; Energy Efficiency of 5G (Release 16)," Mar. 2020, 25 pages.

3GPP TS 28.552 V16.5.0, "3rd Generation Partnership Project; Technical Specification Group Services and System Aspects; Management and Orchestration; 5G Performance Measurements (Release 16)," Mar. 2020, 173 pages.

Office Action in Chinese Appln. No. 202010299418.2, dated Dec. 16, 2022, 10 pages.

International Search Report and Written Opinion in International Appln. No. PCT/CN2021/086813, mailed on Jul. 9, 2021, 16 pages (with English translation).

GSMA, "Generic Slice Template," Oct. 2018, XP052258191, 93 pages.

3GPP TS 29.500, V16.3.0, "3rd Generation Partnership Project; Technical Specification Group Core Network and Terminals; 5G System; Technical Realization of Service Based Architecture; Stage 3 (Release 16)," Mar. 2020, 65 pages.

3GPP TR 28.805, V16.1.0, "3rd Generation Partnership Project ; Technical Specification Group Services and System Aspects; Telecommunication management; Study on management aspects of communication services (Release 16)," Dec. 2019, 42 pages.

Extended European Search Report in European Appln No. 21789136. 5, dated Aug. 25, 2023, 11 pages.

* cited by examiner

700

ENERGY EFFICIENCY EVALUATION METHOD AND RELATED DEVICE

CROSS-REFERENCE TO RELATED APPLICATIONS

This application is a continuation of International Application No. PCT/CN2021/086813, filed on Apr. 13, 2021, which claims priority to Chinese Patent Application No. 202010299418.2, filed on Apr. 16, 2020. The disclosures of the aforementioned applications are hereby incorporated by reference in their entireties.

TECHNICAL FIELD

This disclosure relates to the field of communication technologies, and in particular, to an energy efficiency evaluation method and a related device.

BACKGROUND

Energy efficiency refers to a ratio of services provided for end users to a total amount of energy consumption in energy utilization. "Improving energy efficiency" means to use less energy to perform a same energy service.

In existing technologies, features of network function (Network Function, NF) services that can be provided by network elements in the 4th generation mobile communication technology (4G, the 4th generation mobile communication technology) network are fixed. Generally, when energy efficiency evaluation is performed for a network element in the 4G network, the network element needs to evaluate a ratio of an amount of data transmission of the network element to an amount of energy consumption corresponding to the amount of data transmission.

However, with development of the 5th generation mobile communication technology (5G, the 5th generation mobile communication technology), because a service-based architecture (service-based architecture, SBA) is used for deployment of network-side devices in 5G, functions originally implemented by network elements in 4G are split. As a result, the foregoing energy efficiency evaluation process is no longer applicable. How to implement energy efficiency evaluation in a service-based architecture network is an urgent problem to be resolved.

SUMMARY

Embodiments of this disclosure provide an energy efficiency evaluation method and a related device, to implement energy efficiency evaluation for a target object in a service-based architecture.

A first aspect of embodiments of this disclosure provides an energy efficiency evaluation method, applied to a service producer. In the method, the service producer obtains service energy consumption data of a target object, where the service energy consumption data includes service information and energy consumption information of the target object, and the service producer determines energy efficiency information of the target object based on the service energy consumption data. The target object may include a target object obtained by splitting a function implemented by a network element in a service-based architecture, and the service information indicates a service feature requirement of the target object. Therefore, the service producer may determine the energy efficiency information of the target object based on the service energy consumption data includinging the service information, to implement energy efficiency evaluation for the target object in the service-based architecture.

It should be noted that the service producer may be an element in the service-based architecture, for example, a network element management unit (element manager, EM), a mobile broadband automation engine (Mobile Broadband automation Engine, MAE), a management data analytics module (management data analytics function, MDAF), a network slice management unit (network slice management function, NSMF), a network slice management unit (network slice subnet management function, NSSMF), a network management unit NM (network manager, NM), a communication service management function (communication service management function, CSMF), a data collection and reporting function (data collection and reporting function, DCRF), or another logical network element. This is not limited herein.

In a possible implementation of the first aspect of embodiments of this disclosure, before that the service producer obtains service energy consumption data of a target object, the method may further include: The service producer receives an energy efficiency evaluation request message from a service consumer, where the energy efficiency evaluation request message carries an identifier of the target object, and the service producer triggers, based on the energy efficiency evaluation request message, execution of obtaining the service energy consumption data of the target object.

In this embodiment, the service producer may trigger, based on the energy efficiency evaluation request message sent by the service consumer, the execution of obtaining the service energy consumption data of the target object, where the energy efficiency evaluation request message carries the identifier of the target object, so that the service producer subsequently implements the energy efficiency evaluation for the target object based on the service energy consumption data.

In a possible implementation of the first aspect of embodiments of this disclosure, after that the service producer determines energy efficiency information of the target object based on the service energy consumption data, the method may further include: The service producer sends an energy efficiency evaluation response message to the service consumer, where the energy efficiency evaluation response message includes the energy efficiency information.

In this embodiment, in response to the energy efficiency evaluation request message sent by the service consumer, the service producer sends the energy efficiency information to the service consumer in a plurality of manners. For example, the service producer may synchronously send the energy efficiency evaluation response message to the service consumer based on the energy efficiency evaluation request message, where the energy efficiency evaluation response message may include the energy efficiency information, so that the service consumer can synchronously obtain the energy efficiency information of the target object.

In a possible implementation of the first aspect of embodiments of this disclosure, after that the service producer determines energy efficiency information of the target object based on the service energy consumption data, the method may further include: The service producer sends an energy efficiency evaluation notification message to the service consumer, where the energy efficiency evaluation notification message indicates that the service producer has received the energy efficiency evaluation request message, and the service producer sends a first message to the service consumer, where the first message includes the energy efficiency information.

In this embodiment, in response to the energy efficiency evaluation request message sent by the service consumer, the service producer sends the energy efficiency information to the service consumer in a plurality of manners. For example, the service producer may synchronously send the energy efficiency evaluation notification message to the service consumer based on the energy efficiency evaluation request message, where the energy efficiency evaluation notification message indicates that the service producer has received the energy efficiency evaluation request message, and the service producer sends the first message to the service consumer using another asynchronous message, where the first message includes the energy efficiency information, so that the service consumer can obtain the energy efficiency information of the target object based on the asynchronous message.

In a possible implementation of the first aspect of embodiments of this disclosure, the service information includes a service area, a quantity of service devices, and/or an amount of data transmission.

In this embodiment, the service information indicates the service feature requirement of the target object. For example, the service information may include data such as the service area, the quantity of service devices, and/or the amount of data transmission to reflect the service feature requirement of the target object. Subsequently, the service producer determines the energy efficiency information of the target object based on the service energy consumption data, where the energy efficiency information may indicate energy efficiency information corresponding to the service area of the target object, and/or energy efficiency information corresponding to the quantity of service devices of the target object, and/or energy efficiency information corresponding to the amount of data transmission of the target object. It can be learned from content of the first aspect that there are a plurality of implementations of the target object, so that corresponding energy efficiency evaluation can be implemented for different service feature requirements of the target object.

In a possible implementation of the first aspect of embodiments of this disclosure, the energy efficiency evaluation request message includes a first time parameter, and the service energy consumption data includes service energy consumption data corresponding to the first time parameter; and/or the energy efficiency evaluation request message includes a first service type parameter, and the service energy consumption data includes service energy consumption data corresponding to the first service type parameter.

In this embodiment, the service energy consumption data of the target object may include a plurality of time parameters and/or a plurality of service type parameters. Energy efficiency information determined by the service consumer based on the specified first time parameter and/or first service type parameter carried in the energy efficiency evaluation request message may correspond to the first time parameter and/or the first service type parameter, so that the service consumer implements customized energy efficiency evaluation for the target object.

In a possible implementation of the first aspect of embodiments of this disclosure, the method further includes: The service producer obtains preset configuration information, where the configuration information includes a second time parameter and/or a second service type parameter, and the service producer obtains the service energy consumption data of the target object based on the configuration information, where the service energy consumption data includes service energy consumption data corresponding to the second time parameter and/or service energy consumption data corresponding to the second service type parameter.

In this embodiment, the service energy consumption data of the target object may include a plurality of time parameters and/or a plurality of service type parameters. Energy efficiency information determined by the service consumer based on the specified second time parameter and/or second service type parameter carried in the preset configuration information may correspond to the second time parameter and/or the second service type parameter, so that the service producer implements flexible configuration of an energy efficiency evaluation process for the target object.

A second aspect of embodiments of this disclosure provides an energy efficiency evaluation method, which may be applied to a service consumer. In the method, the service consumer sends an energy efficiency evaluation request message to a service producer, where the energy efficiency evaluation request message may carry an identifier of a target object, and the service consumer receives an energy efficiency evaluation response message sent by the service producer, where the energy efficiency evaluation response message includes energy efficiency information of the target object. The energy efficiency evaluation request message carries the identifier of the target object, and the target object may include a target object obtained by splitting a function implemented by a network element in a service-based architecture. Subsequently, the service consumer may determine the energy efficiency information of the target object based on the energy efficiency evaluation response message sent by the service producer in a synchronous manner, to implement energy efficiency evaluation for the target object in the service-based architecture.

A third aspect of embodiments of this disclosure provides an energy efficiency evaluation method, which may be applied to a service consumer. In the method, the service consumer sends an energy efficiency evaluation request message to a service producer, where the energy efficiency evaluation request message may carry an identifier of a target object; in response to the energy efficiency evaluation request message, the service consumer receives an energy efficiency evaluation notification message sent by the service producer, where the energy efficiency evaluation notification message indicates that the service producer has received the energy efficiency evaluation request message; and the service consumer receives a first message sent by the service producer, where the first message includes energy efficiency information of the target object. The energy efficiency evaluation request message carries the identifier of the target object, and the target object may include a target object obtained by splitting a function implemented by a network element in a service-based architecture. Subsequently, the service consumer may determine the energy efficiency information of the target object based on the energy efficiency evaluation response message sent by the service producer in an asynchronous manner, to implement energy efficiency evaluation for the target object in the service-based architecture.

A fourth aspect of embodiments of this disclosure provides a service producer. The service producer has functions of implementing the method in any one of the first aspect or the possible implementations of the first aspect. The functions may be implemented by hardware, or may be implemented by hardware executing corresponding software. The hardware or software includes one or more modules corresponding to the functions, for example, an obtaining unit, a sending unit, a determining unit, and a receiving unit.

A fifth aspect of embodiments of this disclosure provides a service consumer. The service consumer has functions of implementing the method in any one of the second aspect or the possible implementations of the second aspect. The functions may be implemented by hardware, or may be implemented by hardware executing corresponding software. The hardware or software includes one or more modules corresponding to the functions, for example, a sending unit and a receiving unit.

A sixth aspect of embodiments of this disclosure provides a service consumer. The service consumer has functions of implementing the method in any one of the second aspect or the possible implementations of the second aspect. The functions may be implemented by hardware, or may be implemented by hardware executing corresponding software. The hardware or software includes one or more modules corresponding to the functions, for example, a sending unit and a receiving unit.

A seventh aspect of embodiments of this disclosure provides a service producer, including a processor. The processor is coupled to a memory, the memory is configured to store a computer program or instructions, and the processor is configured to execute the computer program or the instructions in the memory, so that the method in any one of the first aspect or the possible implementations of the first aspect is performed.

An eighth aspect of embodiments of this disclosure provides a service consumer, including a processor. The processor is coupled to a memory, the memory is configured to store a computer program or instructions, and the processor is configured to execute the computer program or the instructions in the memory, so that the method in any one of the second aspect or the possible implementations of the second aspect is performed, or the method in any one of the third aspect or the possible implementations of the third aspect is performed.

A ninth aspect of embodiments of this disclosure provides a computer-readable storage medium storing one or more computer-executable instructions. When the computer-executable instructions are executed by a processor, the processor performs the method in any one of the first aspect or the possible implementations of the first aspect.

A tenth aspect of embodiments of this disclosure provides a computer-readable storage medium storing one or more computer-executable instructions. When the computer-executable instructions are executed by a processor, the processor performs the method in any one of the second aspect or the possible implementations of the second aspect, or the processor performs the method in any one of the third aspect or the possible implementations of the third aspect.

An eleventh aspect of embodiments of this disclosure provides a computer program product (or referred to as a computer program) storing one or more computers. When the computer program product is executed by a processor, the processor performs the method in any one of the first aspect or the possible implementations of the first aspect.

A twelfth aspect of embodiments of this disclosure provides a computer program product storing one or more computers. When the computer program product is executed by a processor, the processor performs the method in any one of the second aspect or the possible implementations of the second aspect, or the processor performs the method in any one of the third aspect or the possible implementations of the third aspect.

A thirteenth aspect of embodiments of this disclosure provides a chip system. The chip system includes a processor, configured to support a service producer in implementing functions in any one of the first aspect or the possible implementations of the first aspect. In a possible design, the chip system may further include a memory. The memory is configured to store program instructions and data that are necessary for the service producer. The chip system may include a chip, or may include a chip and another discrete component.

A fourteenth aspect of embodiments of this disclosure provides a chip system. The chip system includes a processor, configured to support a service consumer in implementing functions in any one of the second aspect or the possible implementations of the second aspect, or configured to support a service consumer in implementing functions in any one of the third aspect or the possible implementations of the third aspect. In a possible design, the chip system may further include a memory. The memory is configured to store program instructions and data that are necessary for the service consumer. The chip system may include a chip, or may include a chip and another discrete component.

A fifteenth aspect of embodiments of this disclosure provides a communication system. An architecture of the communication system includes the service producer in any one of the foregoing embodiments and the service consumer in any one of the foregoing embodiments.

For technical effects brought by any one of the fourth aspect, the seventh aspect, the ninth aspect, the eleventh aspect, the thirteenth aspect, and the fifteenth aspect or the possible implementations thereof, refer to technical effects brought by the first aspect or the different possible implementations of the first aspect. Details are not described herein again.

For technical effects brought by any one of the fifth aspect, the sixth aspect, the eighth aspect, the tenth aspect, the twelfth aspect, the fourteenth aspect, and the fifteenth aspect or the possible implementations thereof, refer to technical effects brought by the second aspect or different possible implementations of the second aspect, or refer to technical effects brought by the third aspect or different possible implementations of the third aspect. Details are not described herein again.

According to the foregoing technical solutions, it can be learned that embodiments of this disclosure have the following advantages:

In the energy efficiency evaluation method provided in embodiments of this disclosure, the service producer obtains the service energy consumption data of the target object, where the service energy consumption data includes the service information and the energy consumption information of the target object, and the service producer determines the energy efficiency information of the target object based on the service energy consumption data. The target object may include the target object obtained by splitting a function implemented by the network element in the service-based architecture, and the service information indicates the service feature requirement of the target object. Therefore, the service producer may determine the energy efficiency information of the target object based on the service energy consumption data including the service information, to implement the energy efficiency evaluation for the target object in the service-based architecture.

DESCRIPTION OF EMBODIMENTS

Embodiments of this disclosure provide an energy efficiency evaluation method and a related device, to implement energy efficiency evaluation for a target object in a service-based architecture.

Embodiments of this disclosure may be applied to various mobile communication systems in which a network side device is deployed using a service-based architecture, for example, a 5G new radio (new radio, NR) system or another communication system such as a future communication system. This is not specifically limited herein.

Figure 1:
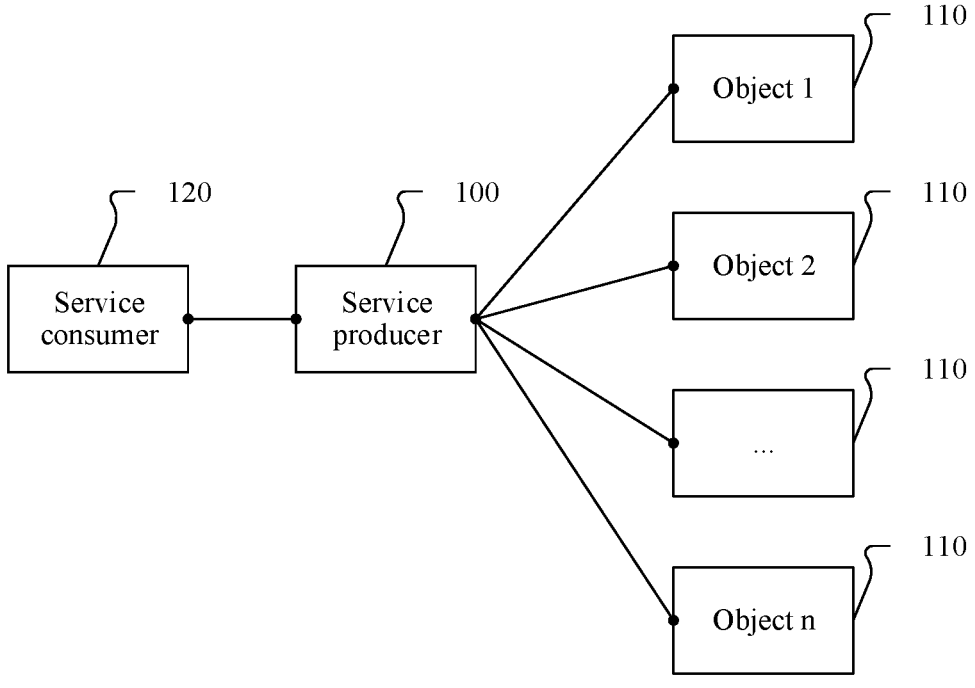
FIG. 1 is a schematic diagram of a communication system according to an embodiment of this disclosure.

For ease of understanding embodiments of this disclosure, a communication system shown in FIG. 1 is first used as an example to describe in detail a communication system applicable to embodiments of this disclosure. FIG. 1 is a schematic diagram of a communication system to which a communication method according to an embodiment of this disclosure is applicable. As shown in FIG. 1, in specific implementation, a service producer (Producer) 100 may include an energy efficiency evaluation service producer (Energy Efficiency Producer) or an energy saving evaluation service producer (Energy Saving Producer), and is configured to perform energy efficiency evaluation for one or more to-be-evaluated objects 110. In addition, the service producer may further exchange information with at least one service consumer (consumer) 120. In specific implementation, the service consumer 120 may include an energy efficiency evaluation service consumer (Energy Efficiency Consumer).

It should be noted that, in embodiments of this disclosure, the service producer 100 may be any one of the following logical network elements: an EM, an MAE, an MDAF, an NSMF, an NSSMF, an NM, a CSMF, a DCRF, or the like, or the service producer is another logical network element implementation. This is not limited herein. Similarly, the one or more to-be-evaluated objects 110 may include, but are not limited to, any one of the following logical network elements: an NF, a network element (network element, NE), a network slice subnet instance (network slice subnet instance, NSSI), a network slice instance (NSI), a communication service instance (communication service instance, CSI), or the like, or the one or more to-be-evaluated objects 110 are other logical network element implementations. This is not limited herein. The service consumer 120 may be any one of the following logical network elements: an EM, an NSMF, an NS SMF, a CSMF, an NM, a physical network function (Physical Network Function, PNF), a virtualized network function (Virtualized Network Function, VNF), or the like, or the service consumer is another logical network element implementation. This is not limited herein.

Energy efficiency refers to a ratio of services provided for end users to a total amount of energy consumption in energy utilization. "Improving energy efficiency" means to use less energy to perform a same energy service. In existing technologies, features of network function (Network Function, NF) services that can be provided by network elements in the 4G network are fixed. Generally, when energy efficiency evaluation is performed for a network element in the 4G network, the network element needs to evaluate a ratio of an amount of data transmission of the network element to an amount of energy consumption corresponding to the amount of data transmission. However, with development of the 5G network, because a service-based architecture is used for deployment of network-side devices in 5G, functions originally implemented by network elements in 4G are split. As a result, the foregoing energy efficiency evaluation process is no longer applicable. How to implement energy efficiency evaluation in a service-based architecture network is an urgent problem to be resolved. For example, an access network element, for example, an evolved node base station (Evolved Node Base station, eNB) in the 4G network is used as an example. Generally, the eNB is a bridge between a terminal device and an evolved core network (Evolved Packet Core, EPC) in 4G. When the energy efficiency evaluation is performed on the eNB, the eNB specifically determines energy efficiency of the eNB using a ratio of a data amount of packet data convergence protocol service data units (Packet Data Convergence Protocol Service Data Unit, PDCP SDU) of the eNB to an energy consumption value.

Figure 2:
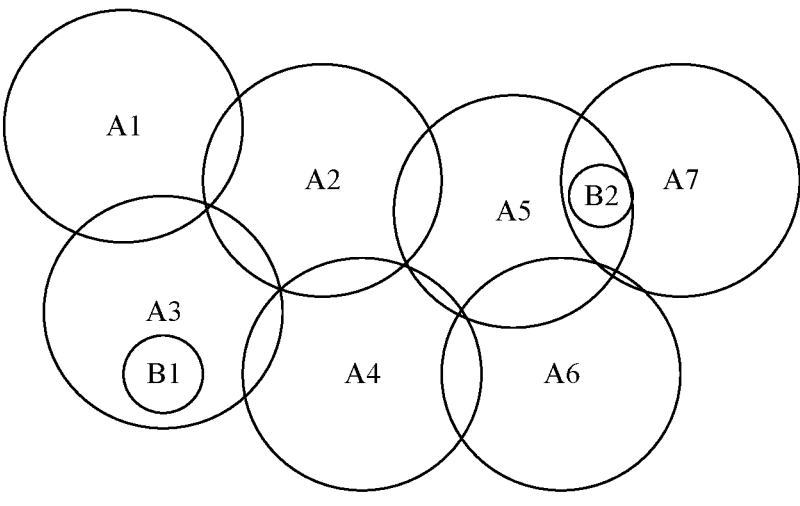
FIG. 2 is another schematic diagram of a communication system according to an embodiment of this disclosure.

In a communication network corresponding to the service-based architecture, the 5G network is used as an example. Implementation of the 5G network includes a slice network, a private network, a subnet network, and the like. As opposed to the original 4G network, an original network element needs to be split for adaptation of new network implementation in the 5G network. Therefore, for an access network element in 5G, for example, in a communication system in FIG. 2, the access network element may implement at least two types of network implementation through splitting: type A and type B. In addition, to meet application scenarios such as enhanced mobile broadband (enhanced mobile broadband, eMBB) services, massive internet of things (massive internet of thing, mIoT) services, and ultra-reliable low-latency communication (ultra-reliable low-latency communication, URLLC) services in the 5G network, the network implementation A and the network implementation B needs to be further split based on different service implementation, so that the access network element includes at least objects such as A1, A2, A3, A4, A5, A6, A7, B1, and B2 that provide different network services and that correspond to areas. The type A or the type B may be a slice network, a private network, a subnet network, or another network implementation type. Numbers (1, 2, 3, 4, 5, 6, and 7) may represent different service data types. In a running process of the access network element corresponding to FIG. 2, if the foregoing energy efficiency evaluation method in the 4G network is used, because the objects (A1, A2, A3, A4, A5, A6, A7, B1, and B2) may be independent of each other in a network data transmission process, and a data amount of transmitted PDCP SDUs cannot correspondingly reflect network performance for an object that processes a URLLC service (carrying a small data packet) or an mIoT service (with massive connections and carrying a small data packet), an implementation process of the foregoing energy efficiency evaluation method in the 4G network is no longer applicable. How to implement the energy efficiency evaluation in the service-based architecture network is an urgent problem to be resolved.

In view of this, embodiments of this disclosure provide an energy efficiency evaluation method and a related device, to implement energy efficiency evaluation for a target object in the service-based architecture.

Figure 3:
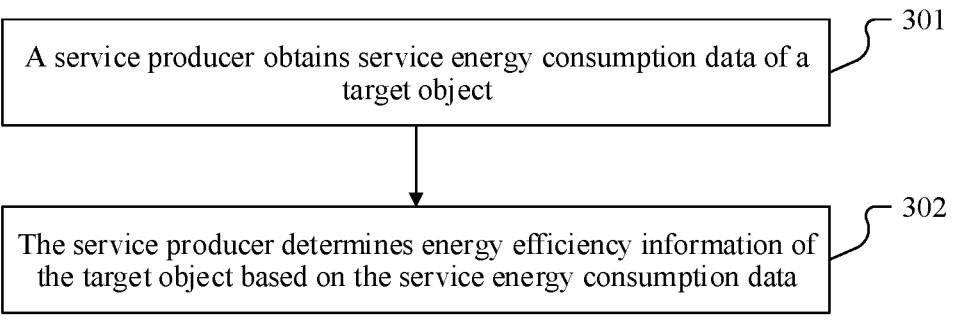
FIG. 3 is a schematic diagram of an energy efficiency evaluation method according to an embodiment of this disclosure.

Refer to FIG. 3. An embodiment of an energy efficiency evaluation method in embodiments of this disclosure includes the following steps.

301. A service producer obtains service energy consumption data of a target object.

In this embodiment, the service producer obtains the service energy consumption data of the target object, where the service energy consumption data includes service information and energy consumption information of the target object.

Specifically, the service producer may include an energy efficiency evaluation service producer or an energy saving evaluation service producer, and is configured to perform energy efficiency evaluation for one or more to-be-evaluated objects, where the target object may include one or more of the one or more to-be-evaluated objects. The service energy consumption data may include the service information and the energy consumption information of the target object. The service information may further include a service area, a quantity of service devices, and/or an amount of data transmission. The service information may indicate a service feature requirement of the target object. A plurality of network types and a plurality of service types that correspond to the target object may have different service feature requirements. For example, a service feature requirement of a target object of an eMBB service type may be a quantity of connected eMBB devices. To be specific, on a premise of same energy consumption, a larger quantity of connected eMBB devices indicates higher energy efficiency of the target object. For another example, a service feature requirement of a target object of a slice service type may be a slice service area. To be specific, on a premise of same energy consumption, a larger slice service area indicates higher energy efficiency of the target object. For example, a combination of a network type (or a data type) and the service information of the target object may include any one or more of the following: (eMBB, quantity of connected eMBB devices), (URLLC, quantity of connected URLLC devices), (mIoT, quantity of connected mIoT devices), (slice service, amount of slice data transmission), (slice service, quantity of connected slice terminals), (slice service, slice service area), (non-public network (Non-Public Network, NPN) service, amount of NPN data transmission), (NPN service, quantity of connected NPN terminals), (NPN service, NPN service area), or a combination of another network type (or another data type) and another service information of the target object. This is not limited herein. The service energy consumption data further includes the energy consumption information, to be specific, information about energy consumed when the target object processes the service information. Specifically, the energy consumption may be in a unit of kilowatt-hour kwh, Joule J, kilojoule KJ, or the like. This is not limited herein.

In an implementation process of the solution, the service producer may determine, based on a preset configuration, that a process of obtaining the service energy consumption data of the target object in step 301 needs to be performed.

In specific implementation, the service producer may determine, based on a carrier's configuration instruction or an administrator entered parameter, that step 301 is performed when the energy efficiency evaluation needs to be performed on the target object. In other words, before step 301, in the method, the service producer may further obtain preset configuration information, where the configuration information may carry an identifier of the target object. Subsequently, the service producer may further determine the target object from the one or more to-be-evaluated objects based on the configuration information, and perform the process of obtaining the service energy consumption data of the target object in step 301.

In an implementation, the configuration information may further include a second time parameter and/or a second service type parameter. In this case, the service producer can obtain service energy consumption data corresponding to the second time parameter and/or service energy consumption data corresponding to the second service type parameter in step 301. The second time parameter may indicate to obtain service energy consumption data corresponding to the target object in the second time parameter. The second time parameter may be specifically a time period or a time point, for example, within a historical week/day/hour, a historical moment, a future moment, or another time parameter. This is not limited herein. The second service type parameter may indicate to obtain service energy consumption data corresponding to a type of a service executed by the target object. For example, the second service type parameter may be specifically eMBB, mIoT, URLLC, a slice service, a subnet service, an NPN service, a private network service, or another service type parameter. This is not limited herein. Therefore, the service producer implements flexible configuration of the energy efficiency evaluation process for the target object.

302. The service producer determines energy efficiency information of the target object based on the service energy consumption data.

In this embodiment, the service producer determines the energy efficiency information of the target object based on the service energy consumption data obtained in step 301. The service producer may obtain the energy efficiency information of the target object through calculation based on two parameters: the service information and the energy consumption information of the target object that are carried in the service energy consumption data.

In a specific implementation process of the solution, the service producer may obtain, through calculation based on the service information and the energy consumption information of the target object, energy consumption corresponding to per unit service, or a service corresponding to per unit energy consumption; or obtain other data through calculation. This is not limited herein. Further, the data obtained through calculation may be directly used as the energy efficiency information of the target object. Alternatively, the energy efficiency information may be evaluation information obtained by comparing the data obtained through calculation with historical energy consumption information of the target object, evaluation information obtained by collecting statistics on the historical energy consumption information of the target object based on the data obtained through calculation, or evaluation information obtained by comparing the data obtained through calculation with energy consumption information of an object other than the target object in the one or more to-be-evaluated objects. The energy efficiency information may be alternatively obtained in another implementation. This is not limited herein.

In addition, if the service producer obtains the service energy consumption data corresponding to the second time parameter and/or the service energy consumption data corresponding to the second service type parameter in step 301, the energy efficiency information determined by the service producer based on the service energy consumption data corresponding to the second time parameter and/or the service energy consumption data corresponding to the second service type parameter also corresponds to the second time parameter and/or the second service type parameter. This implements the flexible configuration corresponding to the energy efficiency evaluation process in the configuration information.

In this embodiment, the service producer obtains the service energy consumption data of the target object, where the service energy consumption data includes the service information and the energy consumption information of the target object, and the service producer determines the energy efficiency information of the target object based on the service energy consumption data. The target object may include a target object obtained by splitting a function implemented by a network element in a service-based architecture, and the service information indicates the service feature requirement of the target object. Therefore, the service producer may determine the energy efficiency information of the target object based on the service energy consumption data including the service information, to implement the energy efficiency evaluation for the target object in the service-based architecture.

In this embodiment of this disclosure, before the implementation process of step 301, the service producer may trigger execution based on the preset configuration, may trigger execution based on a request of a service consumer, or may trigger execution based on other event information. This is not limited herein. When step 301 is triggered for execution based on the request of the service consumer, after step 302 in which the service producer determines the energy efficiency information of the target object, the service producer may further send the energy efficiency information to the service consumer in a plurality of manners. The following provides detailed descriptions using embodiments in FIG. 4 and FIG. 5.

1. The service producer feeds back the energy efficiency information to the service consumer in a synchronous manner.

Figure 4:
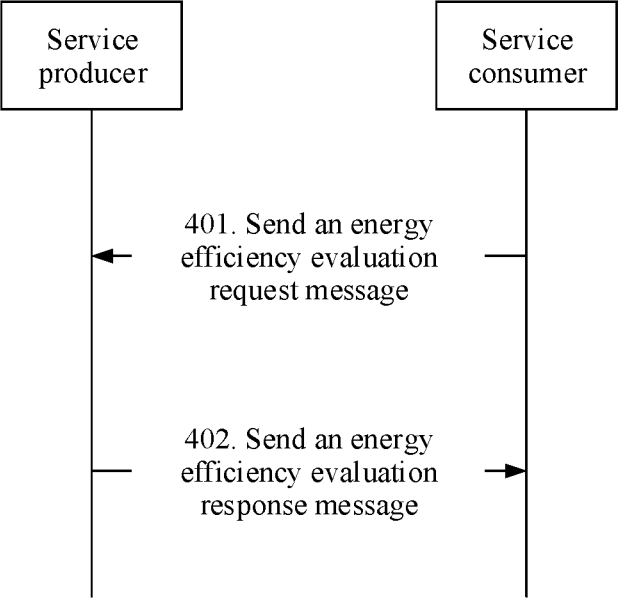
FIG. 4 is another schematic diagram of an energy efficiency evaluation method according to an embodiment of this disclosure.

Refer to FIG. 4. Another embodiment of an energy efficiency evaluation method in embodiments of this disclosure includes the following steps.

401. A service consumer sends an energy efficiency evaluation request message to a service producer.

In this embodiment, the service consumer sends the energy efficiency evaluation request message to the service producer, where the energy efficiency evaluation request message may carry an identifier of a target object.

Specifically, the service consumer may be any one of the following logical network elements: an EM, an NSMF, an NSSMF, a CSMF, an NM, a PNF, a VNF, or another logical network implementation. The service consumer may be connected to the service producer, and is configured to use a network service provided by the service producer. The service producer includes an energy efficiency evaluation service producer or an energy saving evaluation service producer, and is configured to perform energy efficiency evaluation for one or more to-be-evaluated objects. In other words, the service consumer may use the service producer for energy efficiency evaluation for the target object, where the target object may include one or more of the one or more to-be-evaluated objects.

After step 401, the service producer may perform, based on the energy efficiency evaluation request message of the service consumer, step 301 in which the service producer obtains the service energy consumption data of the target object in FIG. 3, and further perform the process of step 302 in which the service producer determines the energy efficiency information of the target object based on the service energy consumption data in FIG. 3.

In an implementation process of the solution, the energy efficiency evaluation request message includes a first time parameter and/or a first service type parameter, where the first time parameter may indicate to obtain service energy consumption data corresponding to the target object in the first time parameter. The first time parameter may be specifically a time period or a time point, for example, within a historical week/day/hour, a historical moment, a future moment, or another time parameter. This is not limited herein. The first service type parameter may indicate to obtain service energy consumption data corresponding to a type of a service executed by the target object. For example, the first service type parameter may be specifically eMBB, mIoT, URLLC, a slice service, a subnet service, an NPN service, a private network service, or another service type parameter. This is not limited herein. Therefore, the service producer obtains the service energy consumption data corresponding to the first time parameter and/or the service energy consumption data corresponding to the first service type parameter in step 301, and in step 302, the energy efficiency information determined by the service producer based on the service energy consumption data corresponding to the first time parameter and/or the service energy consumption data corresponding to the first service type parameter also corresponds to the first time parameter and/or the first service type parameter, where the service energy consumption data includes the service energy consumption data corresponding to the first time parameter. Therefore, this implements flexible configuration corresponding to the energy efficiency evaluation process in the energy efficiency evaluation request message.

402. The service producer sends an energy efficiency evaluation response message to the service consumer.

In this embodiment, after performing step 301 and step 302 based on the energy efficiency evaluation request message obtained in step 401, the service producer sends the energy efficiency evaluation response message to the service consumer, where the energy efficiency evaluation response message includes the energy efficiency information of the target object.

In this embodiment, in response to the energy efficiency evaluation request message sent by the service consumer, the service producer determines that the energy efficiency information can be carried in a synchronous feedback message in response to the energy efficiency evaluation request message, and the service producer synchronously sends the energy efficiency evaluation response message to the service consumer based on the energy efficiency evaluation request message, where the energy efficiency evaluation response message may include the energy efficiency information, so that the service consumer can synchronously obtain the energy efficiency information of the target object.

2. The service producer feeds back the energy efficiency information to the service consumer in an asynchronous manner.

Figure 5:
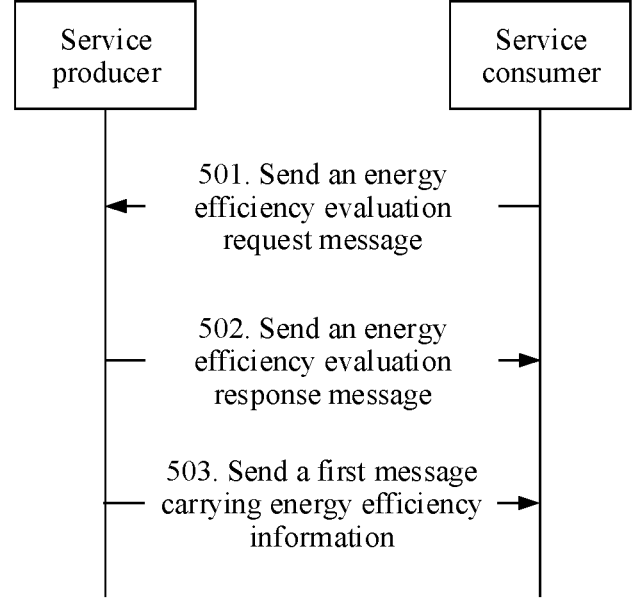
FIG. 5 is another schematic diagram of an energy efficiency evaluation method according to an embodiment of this disclosure.

Refer to FIG. 5. Another embodiment of an energy efficiency evaluation method in embodiments of this disclosure includes the following steps.

501. A service consumer sends an energy efficiency evaluation request message to a service producer.

In this embodiment, an implementation process of step 501 is similar to the implementation process of step 401, and details are not described herein again.

502. The service producer sends an energy efficiency evaluation notification message to the service consumer.

In this embodiment, after performing step 301 and step 302 based on the energy efficiency evaluation request message obtained in step 501, the service producer sends the energy efficiency evaluation notification message to the service consumer, where the energy efficiency evaluation notification message indicates that the service producer has received the energy efficiency evaluation request message.

In an implementation process of the solution, when service producer determines that energy efficiency information cannot be carried in a synchronous feedback message in response to the energy efficiency evaluation request message, the service producer performs step 502 of sending the energy efficiency evaluation notification message to the service consumer synchronously. There are a plurality of manners in which the service producer determines that the energy efficiency information cannot be carried in the synchronous feedback message in response to the energy efficiency evaluation request message, including:

(1) when the service producer is currently under self-check/overhaul of some functions;

(2) when the service producer is currently processing a higher-priority service, for example, when the service producer is currently processing an energy efficiency evaluation request message (carrying a high-priority identifier, a VIP identifier, an emergency service identifier, or another identifier) sent by another service consumer;

(3) when the service producer needs to determine, based on a first time parameter carried in the energy efficiency evaluation request message, energy efficiency information corresponding to a future time period or a future time point, for example, when the first time parameter indicates that energy efficiency information corresponding to the target object in a current year/month/day, within a next month, within a next week, or another time parameter needs to be determined;

(4) when the service producer needs to determine, based on a first service parameter carried in the energy efficiency evaluation request message, energy efficiency information corresponding to continuous services of the first service parameter that are being processed by a current target object or energy efficiency information corresponding to a service that is of the first service parameter and that has never being processed by a current target object, for example, when the current target object is processing continuous services and consequently the service energy consumption data of the target object cannot be calculated in real time, or when the current target object has never processed the service of the first service parameter; or another determining manner. This is not limited herein.

In addition, if the service producer determines that the energy efficiency information can be carried in the synchronous feedback message in response to the energy efficiency evaluation request message, the service producer may directly perform the process of step 402.

503. The service producer sends, to the service consumer, a first message carrying the energy efficiency information.

In this embodiment, after step 502, after the service producer performs step 301 and step 302 based on the energy efficiency evaluation request message obtained in step 501, when the service producer determines that the energy efficiency information of the target object can be fed back to the service consumer, the service producer performs step 503 in which the service producer sends, to the service consumer, the first message carrying the energy efficiency information, where the first message carries the energy efficiency information.

In correspondence to step 502, there are a plurality of manners in which the service producer determines that the energy efficiency information of the target object can be fed back to the service consumer, including:

(1) when the service producer has completed the self-check/overhaul of some functions in step 502;

(2) when the service producer has completed processing of the higher-priority service in step 502;

(3) when the service producer has determined, based on the first time parameter carried in the energy efficiency evaluation request message, the energy efficiency information corresponding to the first time parameter;

(4) when the service producer has determined, based on the first service parameter carried in the energy efficiency evaluation request message, the energy efficiency information corresponding to the first service parameter; or another determining manner. This is not limited herein.

The first message includes any message exchanged between the service producer and the service consumer after step 502, so that the energy efficiency information of the target object is fed back to the service consumer in an asynchronous sending manner.

In this embodiment, in response to the energy efficiency evaluation request message sent by the service consumer, when the service producer determines that the energy efficiency information cannot be carried in the synchronous feedback message in response to the energy efficiency evaluation request message, the service producer synchronously sends the energy efficiency evaluation notification message to the service consumer based on the energy efficiency evaluation request message, where the energy efficiency evaluation notification message indicates that the service producer has received the energy efficiency evaluation request message. Then, when the service producer determines that the energy efficiency information of the target object can be fed back to the service consumer, the service producer sends the first message to the service consumer using another asynchronous message, where the first message includes the energy efficiency information, so that the service consumer can obtain the energy efficiency information of the target object based on the asynchronous message.

The foregoing describes embodiments of this disclosure from the perspective of the method. The following describes a service producer and a service consumer in embodiments of this disclosure from the perspective of specific apparatus implementation.

Figure 6:
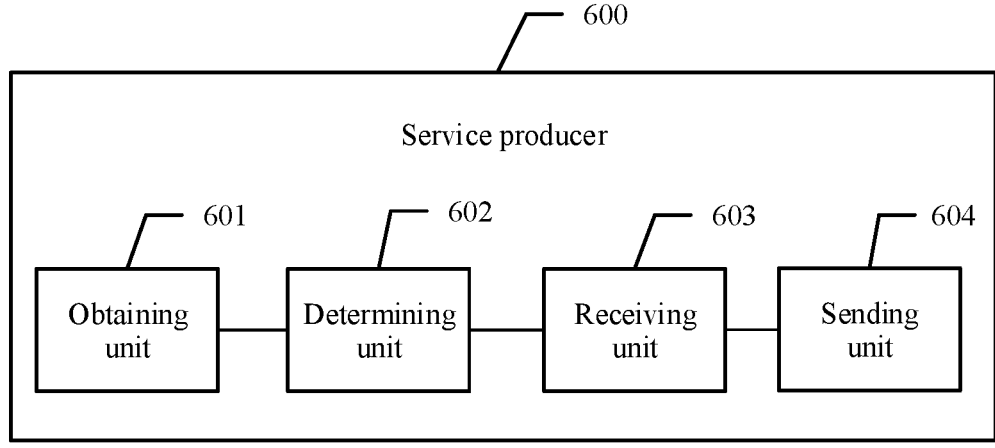
FIG. 6 is a schematic diagram of a service producer according to an embodiment of this disclosure.

Refer to FIG. 6. An embodiment of a service producer 600 in embodiments of this disclosure includes:

an obtaining unit 601, configured to obtain service energy consumption data of a target object, where the service energy consumption data includes service information and energy consumption information of the target object; and a determining unit 602, configured to determine energy efficiency information of the target object based on the service energy consumption data.

In an implementation, the service producer further includes:

a receiving unit 603, configured to receive an energy efficiency evaluation request message from a service consumer, where the energy efficiency evaluation request message carries an identifier of the target object, where the obtaining unit 601 is configured to trigger, based on the energy efficiency evaluation request message, execution of obtaining the service energy consumption data of the target object.

In an implementation, the service producer further includes:

a sending unit 604, configured to send an energy efficiency evaluation response message to the service consumer, where the energy efficiency evaluation response message includes the energy efficiency information.

In an implementation, the service producer further includes:

a sending unit 604, configured to send an energy efficiency evaluation notification message to the service consumer, where the energy efficiency evaluation notification message indicates that the service producer has received the energy efficiency evaluation request message, where the sending unit 604 is further configured to send a first message to the service consumer, where the first message includes the energy efficiency information.

In an implementation, the service information includes a service area, a quantity of service devices, and/or an amount of data transmission.

In an implementation, the energy efficiency evaluation request message includes a first time parameter, and the service energy consumption data includes service energy consumption data corresponding to the first time parameter; and/or the energy efficiency evaluation request message includes a first service type parameter, and the service energy consumption data includes service energy consumption data corresponding to the first service type parameter.

In an implementation, the obtaining unit 601 is further configured to obtain configuration information, where the configuration information includes a second time parameter and/or a second service type parameter; and the obtaining unit 601 is further configured to obtain the service energy consumption data of the target object based on the configuration information, where the service energy consumption data includes service energy consumption data corresponding to the second time parameter and/or service energy consumption data corresponding to the second service type parameter.

It should be noted that for specific content such as an information execution process of the units of the service producer 600, refer to descriptions in the foregoing method embodiments of this disclosure. Details are not described herein again.

Figure 7:
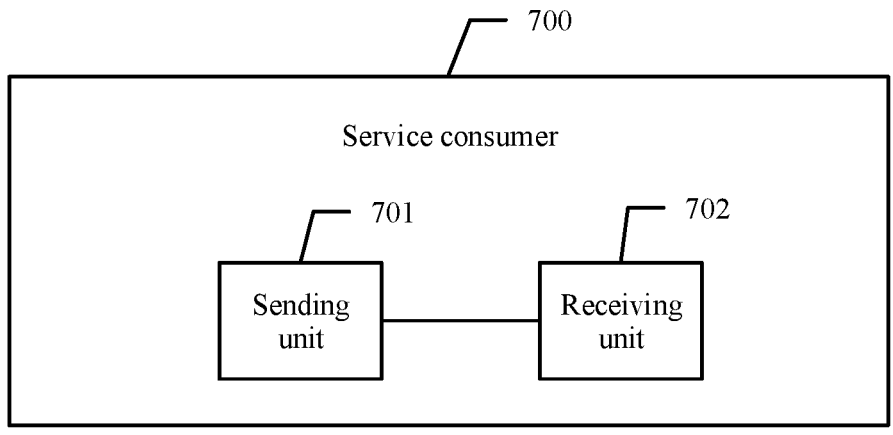
FIG. 7 is a schematic diagram of a service consumer according to an embodiment of this disclosure.

FIG. 7 is a schematic diagram of implementation of a service consumer 700 according to an embodiment of this disclosure. Based on content shown in FIG. 7, an embodiment of the service consumer 700 may include:

a sending unit 701, configured to send an energy efficiency evaluation request message to a service producer, where the energy efficiency evaluation request message carries an identifier of a target object; and a receiving unit 702, configured to receive an energy efficiency evaluation response message sent by the service producer, where the energy efficiency evaluation response message includes energy efficiency information of the target object.

Based on the content shown in FIG. 7, another embodiment of the service consumer 700 may include:

a sending unit 701, configured to send an energy efficiency evaluation request message to a service producer, where the energy efficiency evaluation request message carries an identifier of a target object; and a receiving unit 702, configured to receive an energy efficiency evaluation notification message sent by the service producer, where the energy efficiency evaluation notification message indicates that the service producer has received the energy efficiency evaluation request message, where the receiving unit 702 is further configured to receive a first message sent by the service producer, where the first message includes energy efficiency information of the target object.

It should be noted that for specific content such as an information execution process of the units of the service consumer 700, refer to descriptions in the foregoing method embodiments of this disclosure. Details are not described herein again.

Figure 8:
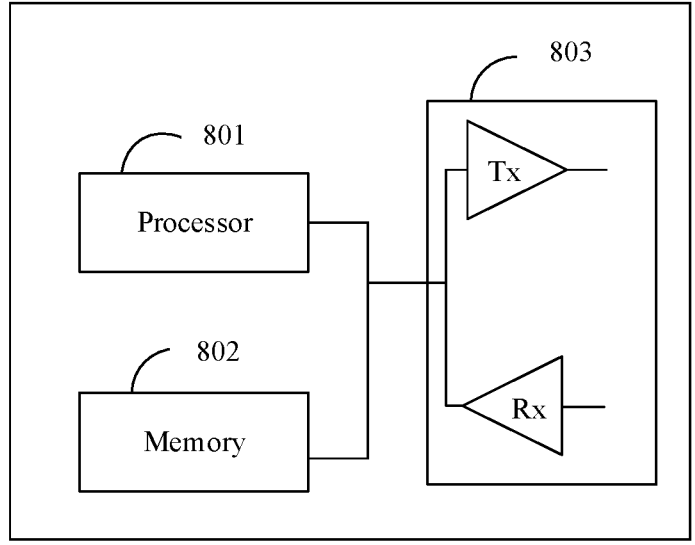
FIG. 8 is a schematic diagram of a service producer according to an embodiment of this disclosure.

FIG. 8 is a schematic diagram of a structure of a service producer according to an embodiment of this disclosure. Refer to FIG. 8. The service producer includes a transceiver 803. The service producer may further include a processor 801. Alternatively, the processor 801 may be a controller. The processor 801 is configured to support the service producer in performing functions of the service producer in FIG. 3 to FIG. 5. The transceiver 803 is configured to support a function of sending and receiving a message between the service producer, a service consumer, and a target object. The service producer may further include a memory 802. The memory 802 is configured to couple to the processor 801, and the memory 802 stores program instructions and data that are necessary for the service producer. The processor 801, the memory 802, and the transceiver 803 are connected. The memory 802 is configured to store instructions. The processor 801 is configured to execute the instructions stored in the memory 802, to control the transceiver 803 to send and receive data, and complete steps of performing corresponding functions by the service producer in the foregoing methods.

It should be noted that the processor in embodiments of this disclosure may be a central processing unit (central processing unit, CPU), a general-purpose processor, a digital signal processor (digital signal processing, DSP), an application-specific integrated circuit (application-specific integrated circuit, ASIC), a field programmable gate array (field programmable gate array, FPGA) or another programmable logic device, a transistor logic device, a hardware component, or a combination thereof. The processor may implement or execute various example logical blocks, modules, and circuits described with reference to content disclosed in this disclosure. Alternatively, the processor may be a combination of processors implementing a computing function, for example, a combination of one or more microprocessors, or a combination of the DSP and a microprocessor. The memory may be integrated into the processor, or may be disposed separately from the processor.

Figure 9:
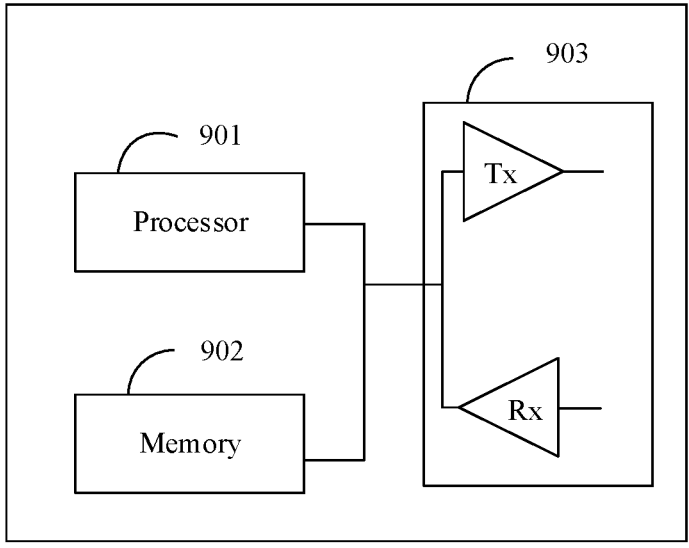
FIG. 9 is another schematic diagram of a service consumer according to an embodiment of this disclosure.

FIG. 9 is a schematic diagram of a structure of a service consumer according to an embodiment of this disclosure. Refer to FIG. 9. The service consumer includes a transceiver 903. The service consumer may further include a processor 901. Alternatively, the processor 901 may be a controller. The processor 901 is configured to support the service consumer in performing functions of the service consumer in FIG. 3 to FIG. 5. The transceiver 903 is configured to support a function of sending and receiving a message between the service consumer, a service producer, and a target object. The service consumer may further include a memory 902. The memory 902 is configured to couple to the processor 901, and the memory 902 stores program instructions and data that are necessary for the service consumer. The processor 901, the memory 902, and the transceiver 903 are connected. The memory 902 is configured to store instructions. The processor 901 is configured to execute the instructions stored in the memory 902, to control the transceiver 903 to send and receive data, and complete steps of performing corresponding functions by the service consumer in the foregoing methods.

It should be noted that the processor in embodiments of this disclosure may be a central processing unit (central processing unit, CPU), a general-purpose processor, a digital signal processor (digital signal processing, DSP), an application-specific integrated circuit (application-specific integrated circuit, ASIC), a field programmable gate array (field programmable gate array, FPGA) or another programmable logic device, a transistor logic device, a hardware component, or a combination thereof. The processor may implement or execute various example logical blocks, modules, and circuits described with reference to content disclosed in this disclosure. Alternatively, the processor may be a combination of processors implementing a computing function, for example, a combination of one or more microprocessors, or a combination of the DSP and a microprocessor. The memory may be integrated into the processor, or may be disposed separately from the processor.

An embodiment of this disclosure further provides a computer-readable storage medium storing one or more computer-executable instructions. When the computer-executable instructions are executed by a processor, the processor performs a method in possible implementations of a service producer.

An embodiment of this disclosure further provides a computer-readable storage medium storing one or more computer-executable instructions. When the computer-executable instructions are executed by a processor, the processor performs the method in the possible implementations of the service consumer.

An embodiment of this disclosure further provides a computer program product (or referred to as a computer program) storing one or more computers. When the computer program product is executed by a processor, the processor performs the method in the possible implementations of the foregoing service producer.

An embodiment of this disclosure further provides a computer program product storing one or more computers. When the computer program product is executed by a processor, the processor performs the method in the possible implementations of the foregoing service consumer.

An embodiment of this disclosure further provides a chip system. The chip system includes a processor, configured to support a service producer in implementing functions in the possible implementations of the service producer. In a possible design, the chip system may further include a memory. The memory is configured to store program instructions and data that are necessary for the service producer. The chip system may include a chip, or may include a chip and another discrete component.

An embodiment of this disclosure further provides a chip system. The chip system includes a processor, configured to support a service consumer in implementing functions in the possible implementations of the service consumer. In a possible design, the chip system may further include a memory. The memory is configured to store program instructions and data that are necessary for the service consumer. The chip system may include a chip, or may include a chip and another discrete component.

An embodiment of this disclosure further provides a communication system. The communication system includes the foregoing service producer and the foregoing service consumer.

In the several embodiments provided in this disclosure, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual coupling or direct coupling or communication connection may be implemented through some interfaces. The indirect coupling or communication connection between the apparatuses or units may be implemented in an electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this disclosure essentially, or the part contributing to the prior art, or all or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

What is claimed is:

1. An energy efficiency evaluation method, comprising:
   receiving, by a service producer, an energy efficiency evaluation request message from a service consumer, wherein the energy efficiency evaluation request message comprises an identifier of a target object;

obtaining, by the service producer in a service-based architecture network, service energy consumption data of the target object, wherein the service energy consumption data comprises service information and energy consumption information of the target object, wherein the target object comprises a target object obtained by splitting a function implemented by a network element in the service-based architecture network and wherein the service information indicates a service feature requirement of the target object; and determining, by the service producer, energy efficiency information of the target object based on the service energy consumption data.

2. The method according to claim 1, wherein before the obtaining, by a service producer, service energy consumption data of a target object, the method further comprises:

triggering, by the service producer based on the energy efficiency evaluation request message, execution of obtaining the service energy consumption data of the target object.

3. The method according to claim 2, wherein after the determining, by the service producer, energy efficiency information of the target object based on the service energy consumption data, the method further comprises:

sending, by the service producer, an energy efficiency evaluation response message to the service consumer, wherein the energy efficiency evaluation response message comprises the energy efficiency information.

4. The method according to claim 2, wherein after the determining, by the service producer, energy efficiency information of the target object based on the service energy consumption data, the method further comprises:

sending, by the service producer, an energy efficiency evaluation notification message to the service consumer, wherein the energy efficiency evaluation notification message indicates that the service producer has received the energy efficiency evaluation request message; and sending, by the service producer, a first message to the service consumer, wherein the first message comprises the energy efficiency information.

5. The method according to claim 2, wherein the energy efficiency evaluation request message comprises at least one of:

a first time parameter, wherein the service energy consumption data comprises service energy consumption data corresponding to the first time parameter; or a first service type parameter, wherein the service energy consumption data comprises service energy consumption data corresponding to the first service type parameter.

6. The method according to claim 1, wherein the service information comprises at least one of a service area, a quantity of service devices, or an amount of data transmission.

7. The method according to claim 1, wherein the method further comprises:

obtaining, by the service producer, configuration information, wherein the configuration information comprises at least one of a second time parameter or a second service type parameter; and obtaining, by the service producer, the service energy consumption data of the target object based on the configuration information, wherein the service energy consumption data comprises at least one of service energy consumption data corresponding to the second time parameter or service energy consumption data corresponding to the second service type parameter.

8. The method according to claim 1, wherein the target object is any one of the following:

a network function entity, a network element, a network slice subnet instance, or a network slice instance.

9. An energy efficiency evaluation method, comprising:

sending, by a service consumer in a service-based architecture network, an energy efficiency evaluation request message to a service producer, wherein the energy efficiency evaluation request message comprises an identifier of a target object, and wherein the target object comprises a target object obtained by splitting a function implemented by a network element in the service-based architecture network; and receiving, by the service consumer, an energy efficiency evaluation response message from the service producer, wherein the energy efficiency evaluation response message comprises energy efficiency information of the target object, wherein the energy efficiency information is determined based on service energy consumption data obtained by the service producer, wherein the service energy consumption data comprises service information and service energy consumption data, and wherein the service information indicates a service feature requirement of the target object.

10. The method according to claim 9, wherein the receiving, by the service consumer, energy efficiency information of the target object from the service producer comprises:

receiving, by the service consumer, an energy efficiency evaluation notification message sent by the service producer, wherein the energy efficiency evaluation notification message indicates that the service producer has received the energy efficiency evaluation request message; and receiving, by the service consumer, a first message sent in an asynchronous manner by the service producer, wherein the first message comprises the energy efficiency information of the target object.

11. The method according to claim 9, wherein the target object is any one of the following:

a network function entity, a network element, a network slice subnet instance, or a network slice instance.

12. A service producer in a service-based architecture network, comprising:

at least one processor; and one or more memories coupled to the at least one processor and storing programming instructions for execution by the at least one processor to:

receive an energy efficiency evaluation request message from a service consumer, wherein the energy efficiency evaluation request message comprises an identifier of a target object;

obtain service energy consumption data of the target object, wherein the service energy consumption data comprises service information and energy consumption information of the target object, wherein the target object comprises a target object obtained by splitting a function implemented by a network element in the service-based architecture network, and wherein the service information indicates a service feature requirement of the target object; and determine energy efficiency information of the target object based on the service energy consumption data.

13. The service producer according to claim 12, wherein the programming instructions are for execution by the at least one processor to:

trigger, based on the energy efficiency evaluation request message, execution of obtaining the service energy consumption data of the target object.

14. The service producer according to claim 13, wherein the programming instructions are for execution by the at least one processor to:

send an energy efficiency evaluation response message to the service consumer, wherein the energy efficiency evaluation response message comprises the energy efficiency information.

15. The service producer according to claim 13, wherein the programming instructions are for execution by the at least one processor to:

send an energy efficiency evaluation notification message to the service consumer, wherein the energy efficiency evaluation notification message indicates that the service producer has received the energy efficiency evaluation request message; and send a first message to the service consumer, wherein the first message comprises the energy efficiency information.

16. The service producer according to claim 13, wherein the energy efficiency evaluation request message comprises at least one of:

a first time parameter, wherein the service energy consumption data comprises service energy consumption data corresponding to the first time parameter; or a first service type parameter, wherein the service energy consumption data comprises service energy consumption data corresponding to the first service type parameter.

17. The service producer according to claim 12, wherein the service information comprises at least one of a service area, a quantity of service devices, or an amount of data transmission.

18. The service producer according to claim 12, wherein the programming instructions are for execution by the at least one processor to:

obtain configuration information, wherein the configuration information comprises at least one of a second time parameter or a second service type parameter; and obtain the service energy consumption data of the target object based on the configuration information, wherein the service energy consumption data comprises at least one of service energy consumption data corresponding to the second time parameter or service energy consumption data corresponding to the second service type parameter.

19. The service producer according to claim 12, wherein the target object is any one of the following:

a network function entity, a network element, a network slice subnet instance, or a network slice instance.

* * * * *